US009369054B2

(12) United States Patent
Kong et al.

(10) Patent No.: US 9,369,054 B2
(45) Date of Patent: Jun. 14, 2016

(54) REDUCING POWER CONSUMPTION OF A SYNCHRONOUS RECTIFIER CONTROLLER (71) Applicant: Dialog Semiconductor Inc., Campbell, CA (US)

(72) Inventors: Pengju Kong, Campbell, CA (US); Andrew Kwok-Cheung Lee, Union City, CA (US)

(73) Assignee: Dialog Semiconductor Inc., Campbell, CA (US)

( * ) Notice: Subject to any disclaimer, the term of this patent is extended or adjusted under 35 U.S.C. 154(b) by 218 days.

(21) Appl. No.: 14/271,868

(22) Filed: May 7, 2014

(65) Prior Publication Data
US 2015/0124495 A1    May 7, 2015

Related U.S. Application Data (60) Provisional application No. 61/898,853, filed on Nov. 1, 2013.

(51) Int. Cl.
*H02M 3/335*    (2006.01)
*H02M 1/00*    (2006.01)

(52) U.S. Cl.
CPC ...... *H02M 3/33592* (2013.01); *H02M 3/33523* (2013.01); *H02M 2001/0032* (2013.01); *Y02B 70/1475* (2013.01); *Y02B 70/16* (2013.01)

(58) Field of Classification Search
CPC .......... H02M 1/36; H02M 2001/0006; H02M 2001/0032; H02M 2001/0058
See application file for complete search history.

(56) References Cited

U.S. PATENT DOCUMENTS

| 6,246,222 | B1 * | 6/2001 | Nilles | H02M 3/1584 323/283 |
| 2004/0125621 | A1 * | 7/2004 | Yang | H02M 3/33592 363/21.14 |
| 2005/0248964 | A1 * | 11/2005 | Dalal | H02M 3/33592 363/21.08 |
| 2006/0018135 | A1 * | 1/2006 | Yang | H02M 3/33592 363/21.14 |
| 2008/0002439 | A1 * | 1/2008 | Allinder | H02M 1/4208 363/21.01 |
| 2008/0002441 | A1 * | 1/2008 | Allinder | H02M 3/33592 363/21.14 |
| 2009/0109715 | A1 * | 4/2009 | Yang | H02M 3/33592 363/89 |
| 2009/0161396 | A1 * | 6/2009 | Lin | H02M 3/33592 363/125 |
| 2009/0168464 | A1 * | 7/2009 | Lin | H02M 3/33592 363/21.06 |
| 2009/0213626 | A1 * | 8/2009 | Yang | H02M 3/33507 363/74 |

(Continued)

OTHER PUBLICATIONS

PCT International Search Report and Written Opinion, PCT Application No. PCT/US2014/055688, Dec. 16, 2014, ten pages.

*Primary Examiner* — Timothy J Dole
*Assistant Examiner* — Yusef Ahmed
(74) *Attorney, Agent, or Firm* — Fenwick & West LLP (57) ABSTRACT

The embodiments herein describe a switched mode power converter. In particular, the embodiments herein disclose techniques for reducing power consumption of a synchronous rectifier controller of the switched mode power converter. The switched mode power converter includes a plurality of circuit components that control operation of a synchronous rectifier included in the switched mode power converter. One or more of the circuit components may be disabled to reduce power consumption.

19 Claims, 5 Drawing Sheets

(56) References Cited

U.S. PATENT DOCUMENTS

| | | | | |
|---|---|---|---|---|
| 2009/0219000 A1* | 9/2009 | Yang | H02M 3/33507 | 323/282 |
| 2010/0110732 A1* | 5/2010 | Moyer | H02M 3/33592 | 363/19 |
| 2010/0302812 A1* | 12/2010 | Moon | H02M 3/33507 | 363/21.01 |
| 2011/0182088 A1* | 7/2011 | Lidak | H02M 3/33507 | 363/21.12 |
| 2011/0194315 A1* | 8/2011 | Gaknoki | H02M 3/33507 | 363/21.17 |
| 2011/0205764 A1* | 8/2011 | Sheng | H02M 1/36 | 363/21.09 |
| 2012/0033460 A1* | 2/2012 | Yeh | H02M 1/083 | 363/21.18 |
| 2013/0094252 A1* | 4/2013 | Sato | H02M 3/33553 | 363/21.11 |
| 2013/0113386 A1 | 5/2013 | Hariharan | | |
| 2013/0241430 A1* | 9/2013 | Lee | H05B 33/0812 | 315/224 |
| 2013/0242625 A1* | 9/2013 | Yan | H05B 33/0815 | 363/49 |
| 2013/0272036 A1* | 10/2013 | Fang | H02M 3/33507 | 363/21.17 |
| 2014/0112028 A1* | 4/2014 | Fahlenkamp | G01R 22/06 | 363/21.12 |
| 2014/0112030 A1* | 4/2014 | Fahlenkamp | H02M 3/33507 | 363/21.14 |
| 2014/0112031 A1* | 4/2014 | Chen | H02M 3/33592 | 363/21.14 |
| 2014/0133186 A1* | 5/2014 | Balakrishnan | H01L 23/49575 | 363/17 |
| 2014/0192575 A1* | 7/2014 | Olivik | H02M 3/33592 | 363/89 |
| 2014/0204623 A1* | 7/2014 | Djenguerian | H02M 1/36 | 363/21.12 |
| 2014/0218976 A1* | 8/2014 | Luo | H02M 3/33507 | 363/21.01 |
| 2014/0268915 A1* | 9/2014 | Kong | H02M 3/33592 | 363/21.14 |
| 2014/0313784 A1* | 10/2014 | Strzalkowski | H02M 3/33584 | 363/17 |
| 2015/0249380 A1* | 9/2015 | Hayakawa | H02M 3/33523 | 363/21.16 |

* cited by examiner

REDUCING POWER CONSUMPTION OF A SYNCHRONOUS RECTIFIER CONTROLLER

CROSS-REFERENCE TO RELATED APPLICATION

This application claims the benefit of U.S. Provisional Patent Application No. 61/898,853 filed on Nov. 1, 2013, which is incorporated by reference in its entirety.

BACKGROUND

1. Field of Technology

Embodiments disclosed herein relate generally to switching power converters, and more specifically, to techniques for reducing power consumption of a synchronous rectifier controller of a switching power converter.

2. Description of the Related Arts

Figure 1:
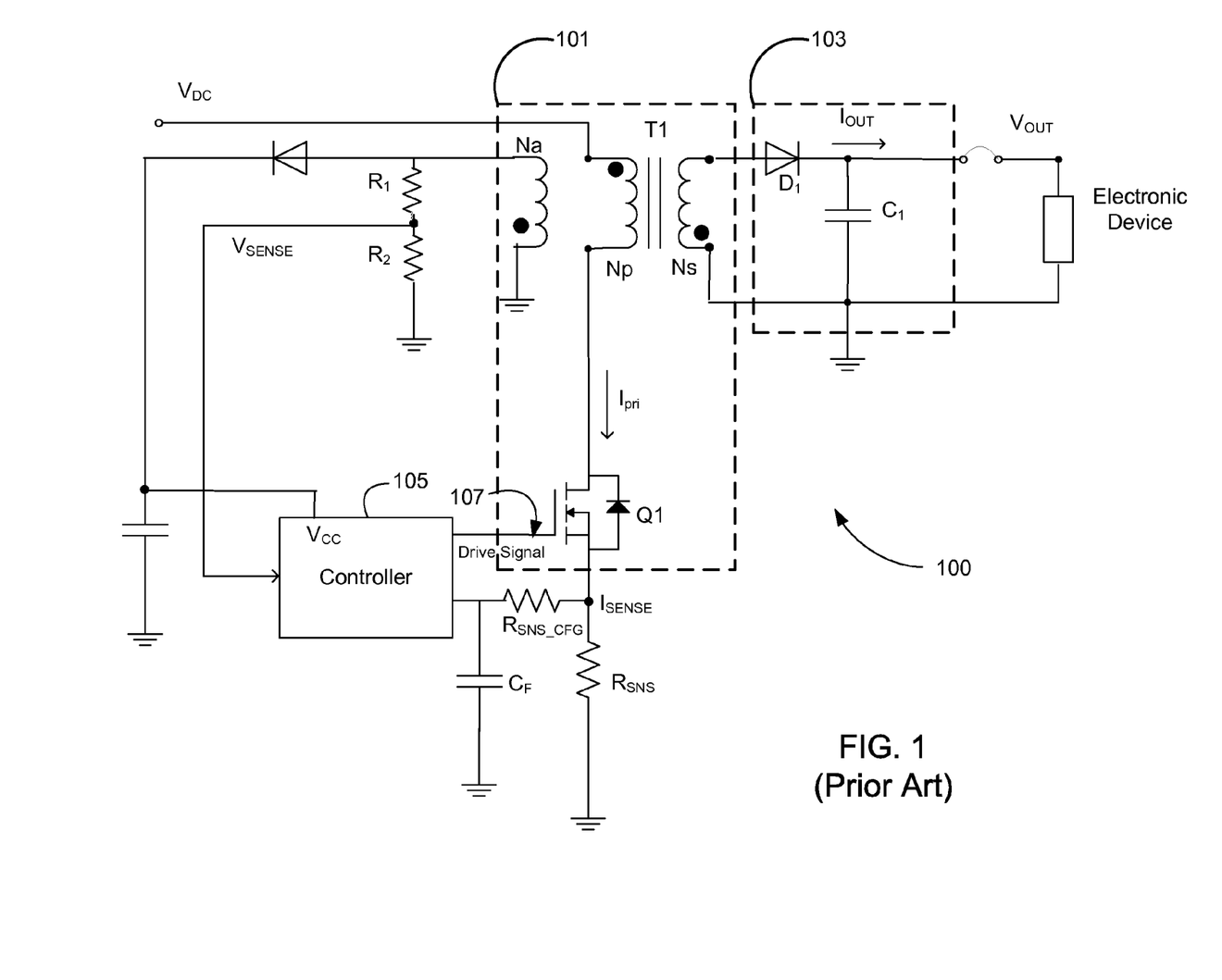
FIG. 1 is a circuit diagram of a conventional switching power converter.

FIG. 1 is a circuit diagram of a conventional flyback type switching power converter 100 that uses a switch Q1 such as a metal-oxide-semiconductor field-effect transistor (MOSFET). The switching power converter 100 includes a power stage 101 and a secondary output stage 103. Power stage 101 includes the switch Q1 and a power transformer T1. Power transformer T1 includes primary winding Np, secondary winding Ns, and auxiliary winding Na. Secondary output stage 103 includes diode $D_1$ and output capacitor $C_1$. A controller 105 controls the ON state and the OFF state of switch Q1 using output drive signal 107 in the form of a pulse with on-times ($T_{ON}$) and off-times ($T_{OFF}$).

AC voltage is received from an AC power source (not shown) and is rectified to provide the unregulated input voltage $V_{DC}$. Energy from the input voltage $V_{DC}$ is stored in transformer T1 while the switch Q1 is turned on, because the diode $D_1$ becomes reverse biased when the switch Q1 is turned on. The energy from the input voltage $V_{DC}$ is then transferred to an electronic device across the capacitor $C_1$ while the switch Q1 is turned off, because the diode $D_1$ becomes forward biased when the switch Q1 is turned off. Diode $D_1$ functions as an output rectifier and capacitor $C_1$ functions as an output filter. The resulting regulated output voltage $V_{OUT}$ is delivered to the electronic device via the output capacitor $C_1$.

In high output current applications, the conduction loss of the diode D1 operating as the output rectifier is significant. A MOSFET or other actively-controlled switch may replace the diode D1 to minimize conduction loss in the power converter 100 during high output current applications. The MOSFET functions as a synchronous rectifier in the power converter 100. To achieve proper operation of the synchronous rectifier, a synchronous rectifier controller is added to the power converter 100 to control the operation of the synchronous rectifier.

Such a synchronous rectifier controller normally includes external sensing inputs, external trigger inputs, internal logic circuits, synchronous rectifier drivers and bias voltage inputs. The synchronous rectifier controller requires a proper bias voltage in order for it to operate and drive the synchronous rectifier. The current consumption at light load is typically between 1 to 2 mA. With a 5V output voltage, the power consumption of synchronous rectifier is as high as 10 mW. Thus, it is difficult for the power converter 100 to meet the 10 mW no load loss requirement.

SUMMARY

The embodiments herein disclose a method for reducing power consumption of a synchronous rectifier controller of a switching power converter. In one embodiment, the switching power converter includes a synchronous rectifier controller that controls the operation of a synchronous rectifier switch included in the switching power converter. That is, the synchronous rectifier controller controls when the synchronous rectifier switch is turned on and turned off.

In one embodiment, the synchronous rectifier controller includes a plurality of circuit components that are associated with various control operations of the synchronous rectifier switch. For example, a turn-on circuit component may control when the synchronous rectifier switch is turned on and a turn-off circuit component may control when the synchronous rectifier switch is turned off. In order to reduce power consumption of the synchronous rectifier controller, the synchronous rectifier controller may disable one or more of the circuit components after the synchronous rectifier switch is turned on.

BRIEF DESCRIPTION OF THE DRAWINGS

The teachings of the embodiments of the present disclosure can be readily understood by considering the following detailed description in conjunction with the accompanying drawings.

DETAILED DESCRIPTION OF EMBODIMENTS

The Figures (FIG.) and the following description relate to various embodiments by way of illustration only. It should be noted that from the following discussion, alternative embodiments of the structures and methods disclosed herein will be readily recognized as viable alternatives that may be employed without departing from the principles discussed herein.

Reference will now be made in detail to several embodiments, examples of which are illustrated in the accompanying figures. It is noted that wherever practicable similar or like reference numbers may be used in the figures and may indicate similar or like functionality. The figures depict various embodiments for purposes of illustration only. One skilled in the art will readily recognize from the following description that alternative embodiments of the structures and methods illustrated herein may be employed without departing from the principles described herein.

Figure 2:
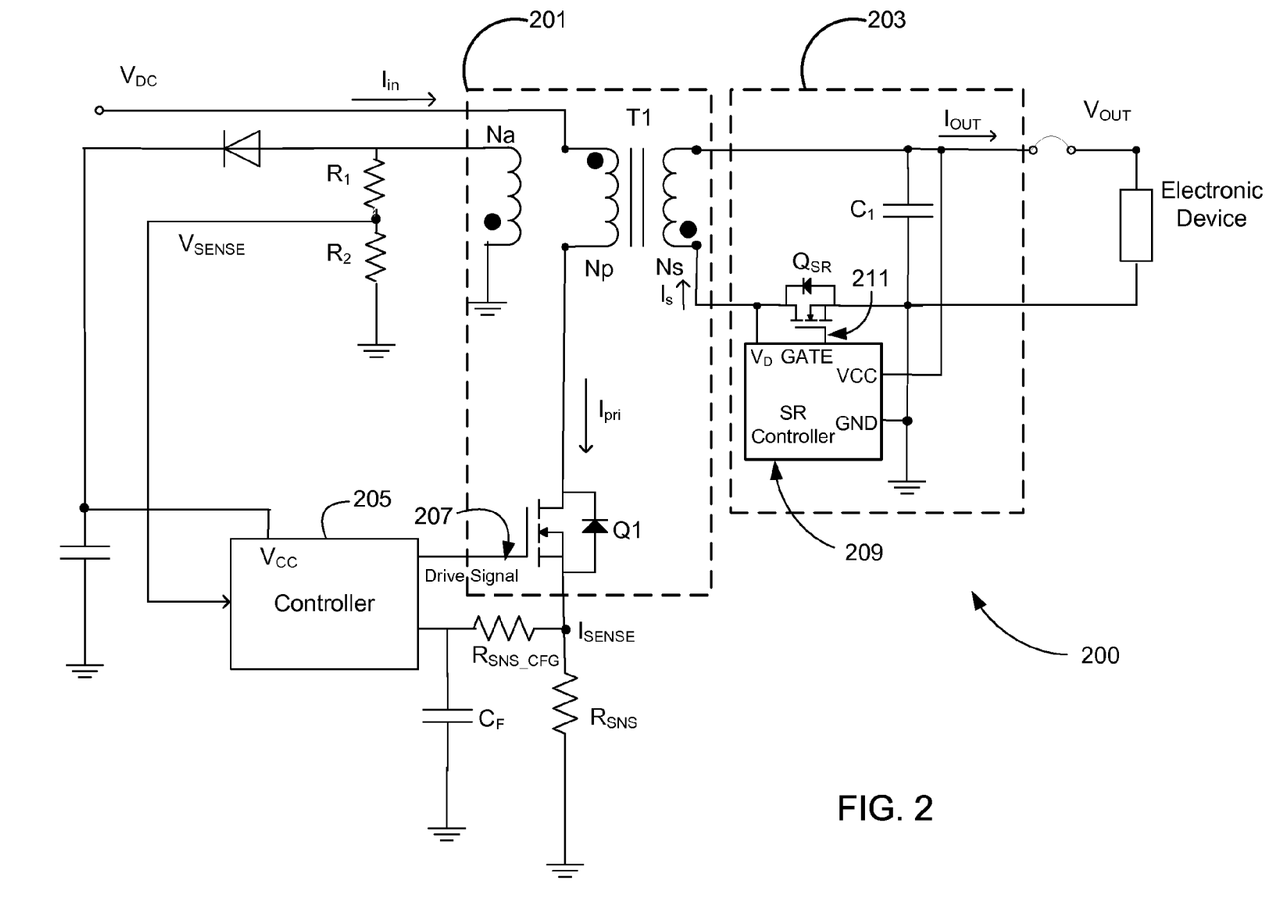
FIG. 2 is a circuit diagram of a switching power converter including a synchronous rectifier circuit according to one embodiment.

FIG. 2 is a circuit diagram of a flyback type switching power converter 200. As shown in FIG. 2, the power converter 200 includes a switch Q1. In one embodiment, the switch Q1 is a MOSFET. However, the switch Q1 may be any type of switching device such as a bipolar junction transistor (BJT). The switching power converter 200 includes a power stage 201 and a secondary output stage 203. Power stage 201 includes the switch Q1 and a power transformer T1. Power transformer T1 includes primary winding Np, secondary winding Ns, and auxiliary winding Na. A controller 205 controls the ON state and the OFF state of switch Q1 using output drive signal 207 in the form of a pulse with on-times ($T_{ON}$) and off-times ($T_{OFF}$). That is, the controller 205 generates the output drive signal 207 that drives the switch Q1.

Secondary output stage 203 includes a synchronous rectifier circuit and output capacitor $C_1$. The synchronous rectifier circuit includes a synchronous rectifier switch $Q_{SR}$ and a synchronous rectifier (SR) controller 209. As shown in FIG. 2, the synchronous rectifier switch $Q_{SR}$ is coupled between the lower side of the secondary winding Ns of the transformer T1 and ground.

AC voltage is received from an AC power source (not shown) and is rectified to provide the unregulated input voltage $V_{DC}$. When switch Q1 is on, energy is stored in transformer T1 via the primary winding magnetizing inductance. When the switch Q1 is on, the synchronous rectifier switch $Q_{SR}$ is disabled (i.e., off) and the body diode of the synchronous rectifier switch $Q_{SR}$ is reverse biased thereby blocking a current pathway of the transformer secondary winding Ns. When switch Q1 is turned off, energy stored in the magnetizing inductance of transformer T1 is transferred to capacitor $C_1$ through the body diode of the synchronous rectifier switch $Q_{SR}$. When the synchronous rectifier switch $Q_{SR}$ is turned on, an additional pathway with a lower voltage drop than the forward biased diode voltage drop is created to deliver the stored energy to capacitor C1. Generally, the synchronous rectifier switch $Q_{SR}$ functions as an output rectifier and capacitor $C_1$ functions as an output filter. The resulting regulated output voltage $V_{OUT}$ is delivered to the electronic device with less power loss than in the case without the synchronous rectifier switch $Q_{SR}$.

As mentioned previously, the controller 205 generates appropriate switch drive pulses 207 to control the on-times and off-times of switch Q1 and regulate the output voltage $V_{OUT}$. The controller 205 controls switch Q1 using a feedback loop based on the sensed output voltage $V_{SENSE}$ and the sensed primary side current $I_{pri}$ in previous switching cycles of the switching power converter 200 to generate the timings to turn on or off the switch Q1 in subsequent switching cycles, in a variety of operation modes including PWM (pulse width modulation) and/or PFM (pulse frequency modulation) modes.

FIG. 2 illustrates primary-side control, where the output voltage $V_{OUT}$ is reflected across auxiliary winding Na of transformer T1, which is input to controller 205 as the voltage $V_{SENSE}$ via a resistive voltage divider comprised of resistors $R_1$ and $R_2$. Based on the sensed output voltage, the controller 205 determines the times at which the switch Q1 is turned on in PFM, PWM, or any other regulation mode employed by the controller 205. However, synchronous-rectification control as described herein may also be used in conjunction with secondary-side output voltage sensing.

As shown in FIG. 2, the drain terminal of the synchronous rectifier switch $Q_{SR}$ is coupled to the lower side of the secondary winding Ns of the power transformer T1 and to the synchronous rectifier (SR) controller 209. The gate terminal of the synchronous rectifier switch $Q_{SR}$ is also coupled to the SR controller 209. The source terminal of the synchronous rectifier switch $Q_{SR}$ is coupled to ground. Note that in other embodiments, the synchronous rectifier switch $Q_{SR}$ may be coupled to the upper side of the secondary winding Ns of the power transformer T1, the output of the switching power converter 200, and the SR controller 209.

The SR controller 209 controls the ON state and OFF state of the synchronous rectifier switch $Q_{SR}$ using output drive signal 211 in the form of a pulse with on-times and off times during a plurality of switching cycles of the synchronous rectifier switch $Q_{SR}$. Particularly, the SR controller 209 generates the output drive signal 211 to turn off the synchronous rectifier switch $Q_{SR}$ during each of the plurality of switching cycles. Alternatively, the SR controller 209 generates the output drive signal 211 to turn off the synchronous rectifier switch $Q_{SR}$ during each switching cycle. When synchronous rectifier switch $Q_{SR}$ is off, energy is stored in the transformer T1 because a pathway is unavailable to transfer the energy to the electronic device. In one embodiment, the SR controller 209 determines when to turn off the synchronous rectifier switch $Q_{SR}$ based on the drain-to-source voltage of the synchronous rectifier switch $Q_{SR}$ sensed at pin $V_D$ of the SR controller 209 as will be further described below with respect to FIG. 3.

Conversely, the SR controller 209 generates the output drive signal 211 to turn on the synchronous rectifier switch $Q_{SR}$ during a plurality of switching cycles of the synchronous rectifier switch $Q_{SR}$ when switch Q1 is off. When synchronous rectifier switch $Q_{SR}$ is turned on, a pathway is created to transfer the energy stored in the transformer T1 to the electronic device when the synchronous rectifier switch $Q_{SR}$ conducts. In one embodiment, the SR controller 209 determines when to turn on synchronous rectifier switch $Q_{SR}$ based on the drain-to-source-voltage of synchronous rectifier $Q_{SR}$ sensed at pin $V_D$ of the SR controller 301 as will be further described below with respect to FIG. 3. In one embodiment, the SR controller 209 controls the ON state and OFF state of the synchronous rectifier switch $Q_{SR}$ using output drive signal 211 during each switching cycle of the synchronous rectifier switch $Q_{SR}$.

Figure 3:
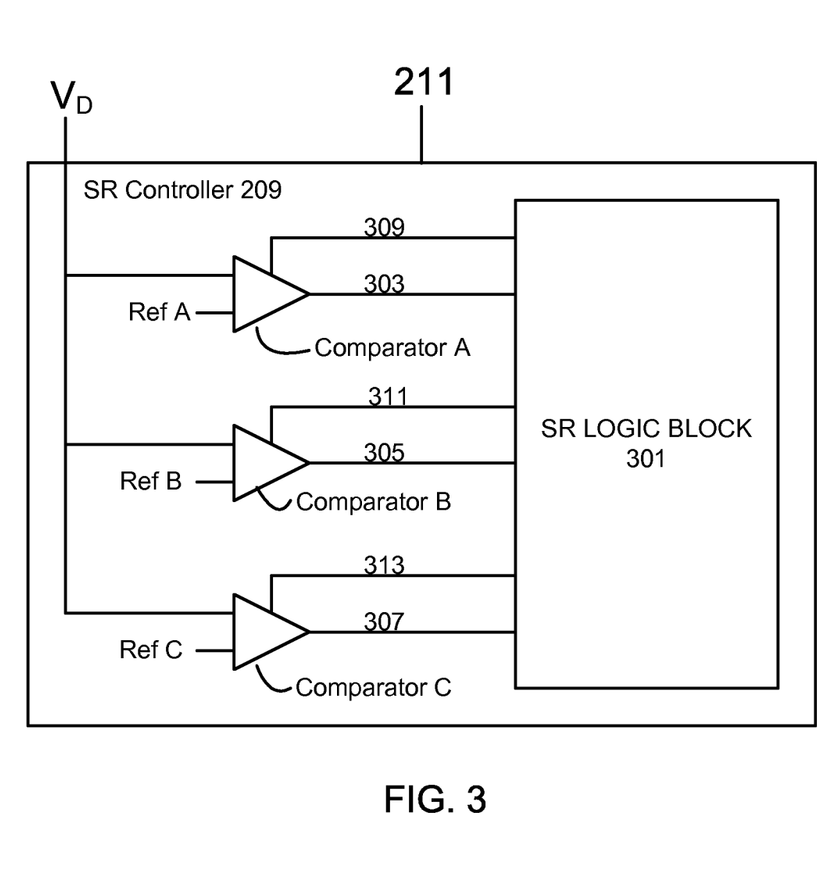
FIG. 3 is a circuit diagram illustrating the synchronous rectifier circuit of FIG. 2 in more detail according to one embodiment.

FIG. 3 is a detailed view of the SR controller 209 according to one embodiment. In general, the SR controller 209 includes a plurality of circuit components that control operation of the synchronous rectifier switch $Q_{SR}$. In one embodiment, the SR controller 209 includes a plurality of comparators as shown in FIG. 3 that are each associated with functionality for controlling the operation of the synchronous rectifier switch $Q_{SR}$. In alternative embodiments, the comparators are not part of the SR controller 209. Other circuit components may be used to control the operation of the synchronous rectifier switch $Q_{SR}$ in alternative embodiments.

As shown in FIG. 3, the SR controller 209 includes comparator A, comparator B, and comparator C. The number of comparators included in SR controller 209 may differ in alternative embodiments. In one embodiment, comparator A (i.e., the turn-on comparator) controls the turn on operation of the synchronous rectifier switch $Q_{SR}$ thereby controlling when the synchronous rectifier switch $Q_{SR}$ is turned on. Conversely, comparator B (i.e., the turn off comparator) controls the turn off operation of the synchronous rectifier switch $Q_{SR}$ thereby controlling when the synchronous rectifier switch $Q_{SR}$ is turned off. Comparator C controls when one or more of the comparators is turned off for power saving purposes as will be further described below.

As shown in FIG. 3, each comparator includes a plurality of inputs. Each comparator includes a first input coupled to the drain voltage ($V_D$) of the synchronous rectifier switch $Q_{SR}$ and a second input coupled to a corresponding reference voltage. For example, comparator A is coupled to reference voltage A (e.g., −0.5V), comparator B is coupled to reference voltage B (e.g., −0.8 mV), and comparator C is coupled to reference voltage C (e.g., 1.5V). In one embodiment, each reference voltage is representative of a threshold current magnitude of the secondary current $I_S$ through the secondary winding Ns of the transformer T1. During each switching cycle of the synchronous rectifier switch $Q_{SR}$, each comparator A, B, C compares its corresponding reference voltage to the drain voltage of the synchronous rectifier switch $Q_{SR}$ and outputs a corresponding trigger signal to a SR logic block 301. The SR logic block 301 controls the operation of the synchronous rectifier switch $Q_{SR}$ during each switching cycle of the synchronous rectifier switch $Q_{SR}$ based on the trigger signals outputted by the comparators.

For example, comparator A compares the drain voltage of the synchronous rectifier switch $Q_{SR}$ to reference A. Comparator A outputs trigger signal 303 to the SR logic block 301 when the drain voltage of the synchronous rectifier switch $Q_{SR}$ exceeds reference A. The SR logic block 301 turns on the synchronous rectifier switch $Q_{SR}$ via output drive signal 211 responsive to receiving the trigger signal 303. Similarly, comparator B compares the drain voltage of the synchronous rectifier switch $Q_{SR}$ to reference B. Comparator B outputs trigger signal 305 to the SR logic block 301 when the drain voltage of the synchronous rectifier switch $Q_{SR}$ exceeds reference B. The SR logic block 301 turns off the synchronous rectifier switch $Q_{SR}$ during the switching cycle via output drive signal 211 responsive to receiving the trigger signal 305. Lastly, comparator C compares the drain voltage of the synchronous rectifier switch $Q_{SR}$ to reference C. Comparator C outputs trigger signal 307 to SR logic block 301 when the drain voltage of the synchronous rectifier switch $Q_{SR}$ exceeds reference C. The SR logic block 301 initiates a timer for disabling one or more of the comparators to reduce power consumption of the SR controller 209 responsive to the trigger signal 307 as will be further described below.

The SR logic block 301 may disable each comparator via an enable signal sent to each comparator. Each comparator is disabled based on the state of the enable signal sent to the comparator. For example, if the enable signal is high, the comparator that receives the enable signal is enabled and the comparator is disabled if the enable signal is low. In one embodiment, the SR logic block 301 disables a comparator by disconnecting the comparator from a bias voltage source that powers the comparator. Alternatively, the SR logic block 301 disables a comparator by setting the comparator to an off state based on the state of the enable signal sent to the comparator. As shown in FIG. 3, the SR logic block 301 sends an enable signal 309 to comparator A, enable signal 311 to comparator B, and enable signal 313 to comparator C.

In one embodiment, one or more of the comparators is disabled in an initial state. For example, comparator B and comparator C are initially disabled. When comparator A is triggered causing the output of signal 303, the SR logic block 301 enables comparator B and comparator C because triggering of comparator A indicates that the synchronous rectifier switch $Q_{SR}$ is turned on thereby requiring the trigger signals generated by the other comparators. In one embodiment, comparator B and comparator C are disabled again after being enabled to save energy consumption.

In one embodiment, comparator B and comparator C are disabled after the synchronous rectifier switch $Q_{SR}$ is turned off during each switching cycle of the synchronous rectifier switch $Q_{SR}$. In particular, the SR logic block 301 determines when to disable comparator B and comparator C by initiating a timer responsive to the trigger signal 307 outputted by comparator C. Generally, trigger signal 307 is outputted at a time after the synchronous rectifier switch $Q_{SR}$ is turned off. When the timer reaches a threshold number (e.g., 10 μs), the SR logic block 301 disables both comparator B and comparator C. Comparator A may remain enabled while comparator B and comparator C are disabled.

The SR logic block 301 re-enables comparator B and comparator C when comparator A is triggered to turn on the synchronous rectifier switch $Q_{SR}$ during a subsequent switching cycle of the synchronous rectifier switch $Q_{SR}$. At full load, the switching frequency of the power converter 200 is high so the timer does not reach the threshold number before comparator A is triggered. Thus, comparator B and comparator C will not be disabled during full load. In another embodiment, the SR logic block 301 immediately disables comparator B once comparator B outputs signal 305. Similarly, the SR logic block 301 may immediately disable comparator C once it outputs signal 307.

In another embodiment, the SR logic block 301 may partially disable or slow down comparator A rather than leave comparator A enabled while comparator B and comparator C are disabled. After the timer reaches the threshold number, the SR logic control block 301 limits the magnitude of the bias current applied to comparator A. In the embodiment where comparator A is partially disabled or slowed down, the output of trigger signal 303 when the drain voltage of the synchronous rectifier switch $Q_{SR}$ exceeds reference A is delayed because comparator A is partially disabled or slowed down. Because the turn on of the synchronous rectifier switch $Q_{SR}$ is delayed, the secondary current L goes through the body diode of the synchronous rectifier switch $Q_{SR}$ thereby increasing conduction loss. In one embodiment, comparator A is only partially disabled or slowed down at very light load (e.g., 2% of full load) and no load. Thus, the benefit of power saving by partially disabling comparator A overcomes the conduction loss introduced by the delay of comparator A. At heavier load (e.g., greater than 5% of full load) or full load, the switching frequency of the power converter 200 is high enough so that the timer does not reach the threshold number. Thus, comparator A will not be partially disabled or slowed down during heavier load or full load.

In general, each comparator requires a minimum bias current to operate correctly. By limiting the bias current applied to a comparator, a delay time for the comparator to respond to a change in the input of the comparator may increase thereby slowing down the comparator. Thus, by limiting the magnitude of the bias current applied to comparator A, total power consumption of the SR controller 209 is further reduced.

Figure 4:
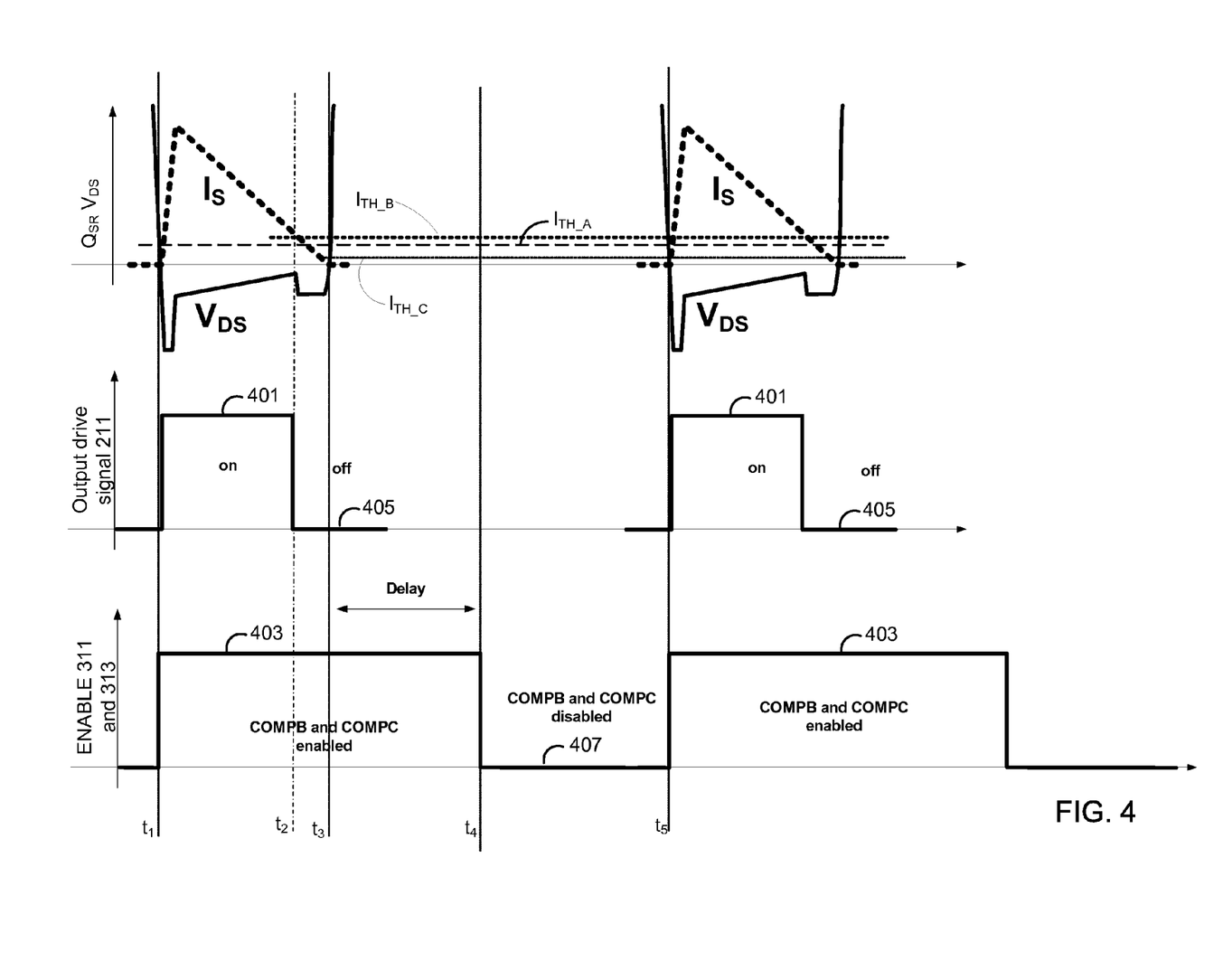
FIG. 4 are waveform diagrams of the switching power converter.
Figure 5:
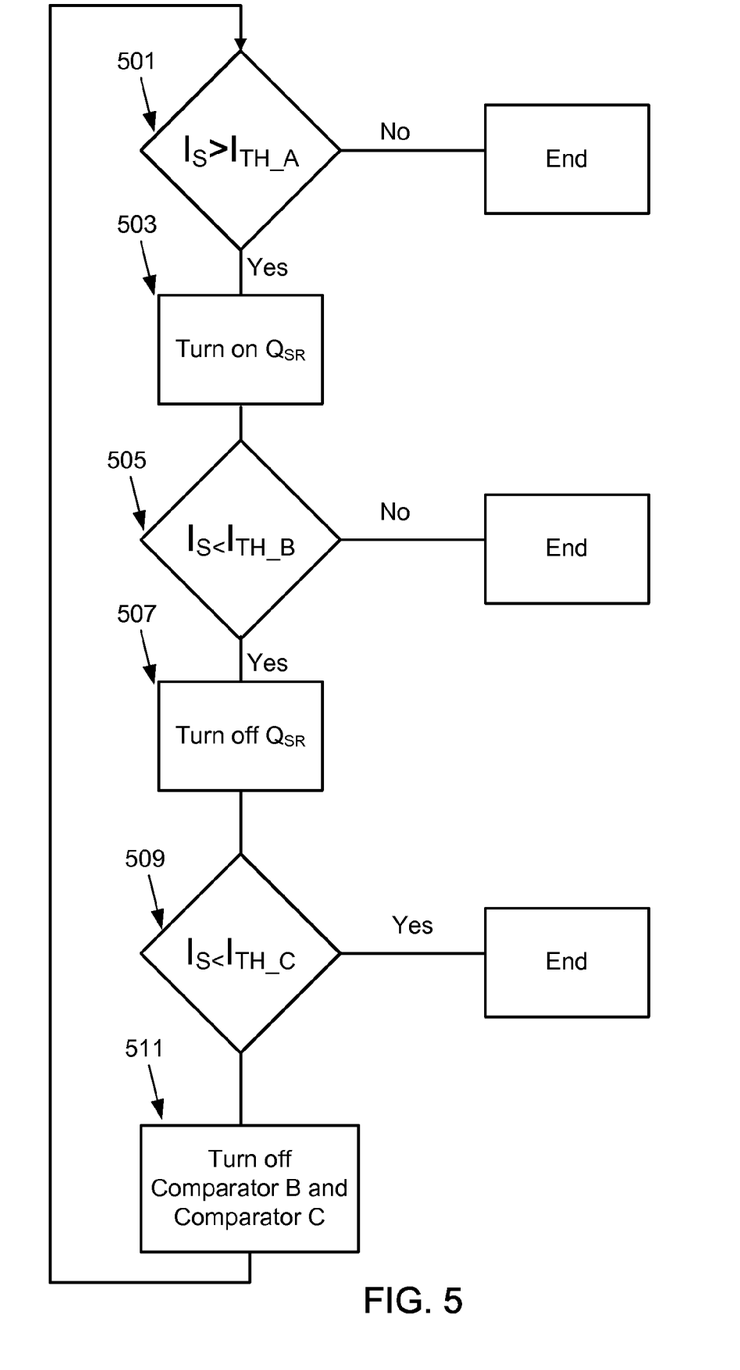
FIG. 5 is a method flow diagram of a synchronous rectifier controller according to one embodiment.

FIG. 4 illustrates waveform diagrams of the power converter 200. FIG. 4 includes a waveform diagram of the drain to source voltage ($V_{DS}$) of the synchronous rectifier switch $Q_{SR}$, a waveform diagram of the output drive signal 211 sent to the synchronous rectifier switch $Q_{SR}$, and a waveform diagram of the comparator enable signals 311 and 313. FIG. 5 is a flow diagram of the logic implemented by the SR logic block 301 according to one embodiment. Reference to both FIG. 4 and FIG. 5 will be made in the following description.

The SR logic block 301 determines 501 if the secondary current $I_S$ shown in the drain to source voltage ($V_{DS}$) waveform is greater than a current threshold associated with comparator A (i.e., $I_{TH\_A}$). The current threshold $I_{TH\_A}$ associated with comparator A is represented by the voltage reference A provided to comparator A. If the secondary current $I_S$ is greater than the current threshold $I_{TH\_A}$, comparator A is triggered and the SR logic block 301 receives signal 303 from comparator A indicative that the secondary current Is is greater than the current threshold associated with comparator A. In response to the signal 303, the SR logic block 301 turns on 503 the synchronous rectifier switch $Q_{SR}$ by issuing a high 401 output drive signal 211 to the gate of the synchronous rectifier switch $Q_{SR}$ at time $t_1$. Furthermore, at time t1 the SR logic block 301 enables comparator B and comparator C by respectively issuing enable signal 311 and 313 in a high state 403. If the secondary current $I_S$ is less than the current threshold $I_{TH\_A}$, the SR logic block 301 performs no action.

While the synchronous rectifier switch $Q_{SR}$ is on, the SR logic block 301 determines 505 if the secondary current $I_S$ is less than a current threshold associated with comparator B (i.e., $I_{TH\_B}$). The current threshold $I_{TH\_B}$ associated with comparator B is represented by the voltage reference B provided to comparator B. If the secondary current $I_S$ is less than the current threshold $I_{TH\_B}$, comparator B is triggered causing the SR logic block 301 to receive signal 305 from comparator B which is indicative that the secondary current Is is less than the current threshold associated with comparator B. In response to the signal 305, the SR logic block 301 turns off 507 the synchronous rectifier switch $Q_{SR}$ by issuing a low 405 gate drive signal 211 at time t2 as shown in FIG. 4. If the secondary current $I_S$ is greater than the current threshold $I_{TH\_B}$, the SR logic block 301 performs no action.

While the synchronous rectifier switch $Q_{SR}$ is off, the SR logic block 301 determines 509 if the secondary current $I_S$ is less than a current threshold associated with comparator C (i.e., $I_{TH\_C}$). The current threshold $I_{TH\_C}$ associated with comparator C is represented by the voltage reference C provided to comparator C. If the secondary current $I_S$ is less than the current threshold $I_{TH\_C}$, comparator C is triggered causing the SR logic block 301 to receive signal 307 from comparator C which is indicative that the secondary current Is is less than the current threshold associated with comparator C. In response to the signal 307, the SR logic block 301 turns off 511 comparator B and comparator C.

As mentioned previously, the SR logic block 301 may immediately turn off comparator B and comparator C in response to signal 307. Alternatively, the SR logic block 301 may initiate a timer and when the timer reaches a threshold, the SR logic block 301 turns off comparator C and comparator B. As shown in FIG. 4 once the secondary current $I_S$ reaches current threshold $I_{TH\_C}$ at time t3, a timer is triggered as represented by the "delay" shown in FIG. 4. The SR logic block 301 disables comparator B and comparator C at the end of the delay by issuing the enable signal 311 and 313 in the low state 407 at time t4. In addition to turning off comparator B and comparator C, the SR logic block 301 may slow down the operation of comparator A by limiting the bias current applied to comparator A although not shown in FIG. 4. The method repeats with SR logic block 301 determining 501 if the secondary current $I_S$ is greater than a current threshold associated with comparator A (i.e., $I_{TH\_A}$) and turning on the synchronous rectifier switch $Q_{SR}$ by issuing a high 401 output drive signal 211 to the gate of the synchronous rectifier switch $Q_{SR}$ at time $t_5$.

Upon reading this disclosure, those of skill in the art will appreciate still additional alternative designs for a switching power converter capable of responding to dynamic load conditions. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention.

What is claimed is:

1. A switching power converter comprising:
   a magnetic component coupled to an input voltage and an output of the switching power converter;
   a switch coupled to the magnetic component, energy stored in the magnetic component when the switch is in an on state;
   a first controller configured to generate a first control signal to turn on or turn off the switch during each switching cycle of the switch to maintain regulation of the output of the switching power converter;
   a synchronous rectifier switch configured to rectify an output voltage at the output of the switching power converter, the synchronous rectifier switch having at least a first terminal and a second terminal, the first terminal coupled to the magnetic component;
   a plurality of circuit components configured to output trigger signals that control operation of the synchronous rectifier switch based on a voltage at a terminal of the synchronous rectifier switch, the plurality of circuit components including a first comparator configured to output a first trigger signal that disables one or more of the plurality of circuit components based on a comparison of the voltage at the terminal of the synchronous rectifier switch and a first reference signal; and
   a second controller configured to receive the trigger signals and is configured to generate a second control signal to turn on or turn off the synchronous rectifier switch during a plurality of switching cycles of the synchronous rectifier switch based on the trigger signals;
   wherein the second controller is further configured to receive the first trigger signal from the first comparator and disable one or more of the plurality of circuit components during a switching cycle of the synchronous rectifier switch after the synchronous rectifier switch is turned off during the switching cycle based on the first trigger signal received from the first comparator.

2. The switching power converter of claim 1, wherein the plurality of circuit components are included in the second controller.

3. The switching power converter of claim 1, wherein the plurality of circuit components include:
   a second comparator configured to generate a second trigger signal that triggers turn on of the synchronous rectifier switch during the switching cycle of the synchronous rectifier switch based on a comparison of the voltage at the terminal of the synchronous rectifier switch and a second reference signal; and
   a third comparator configured to generate a third trigger signal that triggers turn off of the synchronous rectifier switch during the switching cycle of the synchronous rectifier switch based on a comparison of the voltage at the terminal of the synchronous rectifier switch and a third reference signal;
   wherein the second controller is configured to generate the second control signal to turn on the synchronous rectifier switch during the switching cycle of the synchronous rectifier switch responsive to receiving the second trigger signal and wherein the second controller is configured to generate the second control signal to turn off the synchronous rectifier switch during the switching cycle of the synchronous rectifier switch responsive to receiving the third trigger signal.

4. The switching power converter of claim 3, wherein the terminal of the synchronous rectifier switch is a drain terminal.

5. The switching power converter of claim 3, wherein the second controller is configured to disable one or more of the first comparator, the second comparator, and the third comparator after a threshold amount of time from receiving the first trigger signal from the first comparator.

6. The switching power converter of claim 3, wherein the second controller is configured to disable one or more of the plurality of circuit components during the switching cycle of the synchronous rectifier switch by partially disabling the first second comparator responsive to the synchronous rectifier switching being turned off during the switching cycle.

7. The switching power converter of claim 1, wherein the second controller is configured to re-enable the one or more of the plurality of circuit components during a subsequent switching cycle following the switching cycle when the one or more of the plurality of circuit components were disabled responsive to the second controller turning on the synchronous rectifier switch during the subsequent switching cycle.

8. The switching power converter of claim 7, wherein the second controller is configured to partially disable the second comparator by limiting a magnitude of bias current applied to the second comparator.

9. In a second controller, a method of controlling a switching power converter, the switching power converter including a magnetic component coupled to an input voltage and an output of the switching power converter, a switch coupled to the magnetic component, energy stored in the magnetic component when the switch is in an on state, the switching power converter further including a first controller configured to generate a first control signal to turn on or turn off the switch at each switching cycle of the switch to maintain regulation of the output of the switching power converter, a synchronous rectifier switch configured to rectify an output voltage at the output of the switching power converter, a plurality of circuit components configured to output trigger signals that control operation of the synchronous rectifier switch based on a voltage at a terminal of the synchronous rectifier switch, the plurality of circuit components including a first comparator configured to output a first trigger signal that disables one or more of the plurality of circuit components based on a comparison of the voltage at the terminal of the synchronous rectifier switch and a first reference signal and the switching power converter further including the second controller, the method comprising:
receiving the trigger signals outputted by the plurality of circuit components, the trigger signals including the first trigger signal from the first comparator;
generating a second control signal to turn on or turn off the synchronous rectifier switch during a plurality of switching cycles of the synchronous rectifier switch based on the trigger signals; and
disabling one or more of the plurality of circuit components during a switching cycle of the synchronous rectifier switch after the synchronous rectifier switch is turned off during the switching cycle based on the first trigger signal received from the first comparator.

10. The method of claim 9, wherein the plurality of circuit components include a second comparator configured to generate a second trigger signal that triggers turn on of the synchronous rectifier switch during the switching cycle of the synchronous rectifier switch based on a comparison of the voltage at the terminal of the synchronous rectifier switch and a second reference signal, and a third comparator configured to generate a third trigger signal that triggers turn off of the synchronous rectifier switch during the switching cycle of the synchronous rectifier switch based on a comparison of the voltage at the terminal of the synchronous rectifier switch and a third reference signal, and the method further comprising:
generating the first control signal to turn on the synchronous rectifier switch during the switching cycle of the synchronous rectifier switch responsive to receiving the second trigger signal; and
generating the second control signal to turn off the synchronous rectifier switch during the switching cycle of the synchronous rectifier switch responsive to receiving the third trigger signal.

11. The method of claim 10, further comprising:
disabling one or more of the first comparator, the second comparator, and the third comparator after a threshold amount of time from receiving the first trigger signal from the first comparator.

12. The method of claim 10, further comprising:
disabling one or more of the plurality of circuit components during the switching cycle of the synchronous rectifier switch by partially disabling the second comparator responsive to the synchronous rectifier switching being turned off during the switching cycle.

13. The method of claim 9, further comprising:
re-enabling the one or more of the plurality of circuit components during a subsequent switching cycle following the switching cycle when the one or more of the plurality of circuit components were disabled responsive to the second controller turning on the synchronous rectifier switch during the subsequent switching cycle.

14. The method of claim 10, wherein partially disabling the first comparator comprises limiting a magnitude of bias current applied to the second comparator.

15. A switching power converter comprising:
a magnetic component coupled to an input voltage and an output of the switching power converter;
a switch coupled to the magnetic component, energy stored in the magnetic component when the switch is in an on state;
a first controller configured to generate a first control signal to turn on or turn off the switch during each switching cycle of the switch to maintain regulation of the output of the switching power converter;
a synchronous rectifier switch configured to rectify an output voltage at the output of the switching power converter, the synchronous rectifier switch having at least a first terminal and a second terminal, the first terminal coupled to the magnetic component;
a plurality of circuit components configured to output trigger signals based on a voltage at a terminal of the synchronous rectifier switch, the trigger signals controlling operation of the synchronous rectifier switch; and
a second controller configured to receive the trigger signals and is configured to generate a second control signal to turn on or turn off the synchronous rectifier switch during a plurality of switching cycles of the synchronous rectifier switch based on the trigger signals;
wherein the second controller is further configured to disable one or more of the plurality of circuit components during a switching cycle of the synchronous rectifier switch after the synchronous rectifier switch is turned off during the switching cycle by disconnecting one or more of the plurality of circuit components from a voltage source that powers the one or more of the plurality of circuit components.

16. The switching power converter of claim 15, wherein the plurality of circuit components are included in the second controller.

17. The switching power converter of claim 16, wherein the plurality of circuit components include:
a first comparator configured to generate a first trigger signal that triggers turn on of the synchronous rectifier switch during the switching cycle of the synchronous rectifier switch based on a comparison of the voltage at the terminal of the synchronous rectifier switch and a first reference signal; and
a second comparator configured to generate a second trigger signal that triggers turn off of the synchronous rectifier switch during the switching cycle of the synchronous rectifier switch based on a comparison of the voltage at the terminal of the synchronous rectifier switch and a second reference signal;

wherein the second controller is configured to generate the second control signal to turn on the synchronous rectifier switch during the switching cycle of the synchronous rectifier switch responsive to receiving the first trigger signal and wherein the second controller is configured to generate the second control signal to turn off the synchronous rectifier switch during the switching cycle of the synchronous rectifier switch responsive to receiving the second trigger signal.

18. The switching power converter of claim 17, wherein the plurality of circuit components further includes a third comparator configured to generate a third trigger signal that triggers disabling of at least one of the first comparator, the second comparator, and the third comparator during the switching cycle of the synchronous rectifier switch, the third comparator configured to generate the third trigger signal based on a comparison of the voltage at the terminal of the synchronous rectifier switch and a third reference signal.

19. The switching power converter of claim 18, wherein the second controller is configured to disable one or more of the first comparator, the second comparator, and the third comparator after a threshold amount of time from receiving the third trigger signal from the third comparator.

* * * * *